United States Patent
Matsudaira

(10) Patent No.: US 10,783,070 B2
(45) Date of Patent: Sep. 22, 2020

(54) MEMORY SYSTEM HAVING FIRST AND SECOND CORRESPONDENCE TABLES AND METHOD OF CONTROLLING MEMORY SYSTEM

(71) Applicant: TOSHIBA MEMORY CORPORATION, Tokyo (JP)

(72) Inventor: Hiroki Matsudaira, Funabashi Chiba (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 3 days.

(21) Appl. No.: 16/114,019

(22) Filed: Aug. 27, 2018

(65) Prior Publication Data

US 2019/0294539 A1  Sep. 26, 2019

(30) Foreign Application Priority Data

Mar. 23, 2018 (JP) ................................. 2018-055782

(51) Int. Cl.
| | |
|---|---|
| *G06F 12/02* | (2006.01) |
| *G06F 12/0804* | (2016.01) |
| *G06F 11/14* | (2006.01) |
| *G06F 3/06* | (2006.01) |

(52) U.S. Cl.
CPC ........ *G06F 12/0246* (2013.01); *G06F 3/0659* (2013.01); *G06F 11/1441* (2013.01); *G06F 12/0804* (2013.01); *G06F 2212/1016* (2013.01); *G06F 2212/2022* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 8,130,557 | B2 * | 3/2012 | Suda ................... | G06F 12/0246 |
| | | | | 365/189.011 |
| 8,725,932 | B2 | 5/2014 | Yano et al. | |
| 8,745,443 | B2 | 6/2014 | Hirao et al. | |
| 8,909,851 | B2 * | 12/2014 | Jones ................... | G06F 12/0246 |
| | | | | 711/103 |
| 9,213,635 | B2 | 12/2015 | Yano et al. | |
| 2010/0169553 | A1 * | 7/2010 | Yano .................... | G06F 12/0866 |
| | | | | 711/103 |

(Continued)

*Primary Examiner* — Michael Alsip
(74) *Attorney, Agent, or Firm* — Kim & Stewart LLP

(57) ABSTRACT

A memory system comprises a first memory including physical blocks, a second memory storing a first correspondence table in which a logical cluster address corresponding to an address assigned to data received from a host is correlated with a logical group number corresponding to a block group and a logical cluster number corresponding to a location within the block group, and a second correspondence table in which first physical block numbers corresponding to first physical blocks are correlated with a first logical group number and second physical block numbers corresponding to second physical blocks are correlated with a second logical group number, and a controller circuit that updates the first correspondence table when new data is written to the first physical blocks, and the second correspondence table, without changing the first corresponding table, when data is moved from the first to the second physical blocks.

12 Claims, 9 Drawing Sheets

(56) References Cited

U.S. PATENT DOCUMENTS

2011/0022784 A1* 1/2011 Yano .................. G06F 12/0246
                                                        711/103
2015/0347294 A1   12/2015 Ruan et al.
2017/0160989 A1    6/2017 Hsieh et al.

* cited by examiner

MEMORY SYSTEM HAVING FIRST AND SECOND CORRESPONDENCE TABLES AND METHOD OF CONTROLLING MEMORY SYSTEM

CROSS-REFERENCE TO RELATED APPLICATIONS

This application is based upon and claims the benefit of priority from Japanese Patent Application No. 2018-055782, filed Mar. 23, 2018, the entire contents of which are incorporated herein by reference.

FIELD

Embodiments described herein relate generally to a memory system and a method of controlling a memory system.

BACKGROUND

In recent years, the capacity of a memory system, e.g., a solid state drive (SSD), having a NAND flash memory which is a non-volatile semiconductor memory has increased. The memory system further includes a memory that can be accessed faster than the NAND flash memory.

When an improper shutdown (or an unexpected power shutdown) occurs, the memory system performs processing after activation in accordance with the normal supply of the power again after the improper shutdown. In the processing after activation, data rewriting related to data that could not be written to the NAND flash memory because of the improper shutdown may be performed.

DETAILED DESCRIPTION

Embodiments provide a memory system and a method of controlling a memory system capable of reducing an activation processing time after an improper shutdown.

In general, according to one embodiment, a memory system includes a first memory, a second memory, and a controller circuit. The first memory includes physical blocks, and the second memory stores a first correspondence table in which a logical cluster address corresponding to an address assigned to data received from a host is correlated with a logical group number corresponding to a block group and a logical cluster number corresponding to a location within the block group, and a second correspondence table in which first physical block numbers corresponding to first physical blocks are correlated with a first logical group number and second physical block numbers corresponding to second physical blocks are correlated with a second logical group number. The controller circuit is configured to update the first correspondence table when new data is written to the first physical blocks, and update the second correspondence table, without changing the first corresponding table, when data is moved from the first physical blocks to the second physical blocks.

Hereinafter, the present disclosure will be described in detail with reference to the drawings. The present disclosure is not limited to the following embodiment. A configuration element described in the following embodiment may be an element that can be easily substituted by those skilled in the art or is substantially the same.

A memory system and control processing of a memory system of the embodiment will be described with reference to FIGS. 1 to 9.

Configuration Example of Memory System

Figure 1:
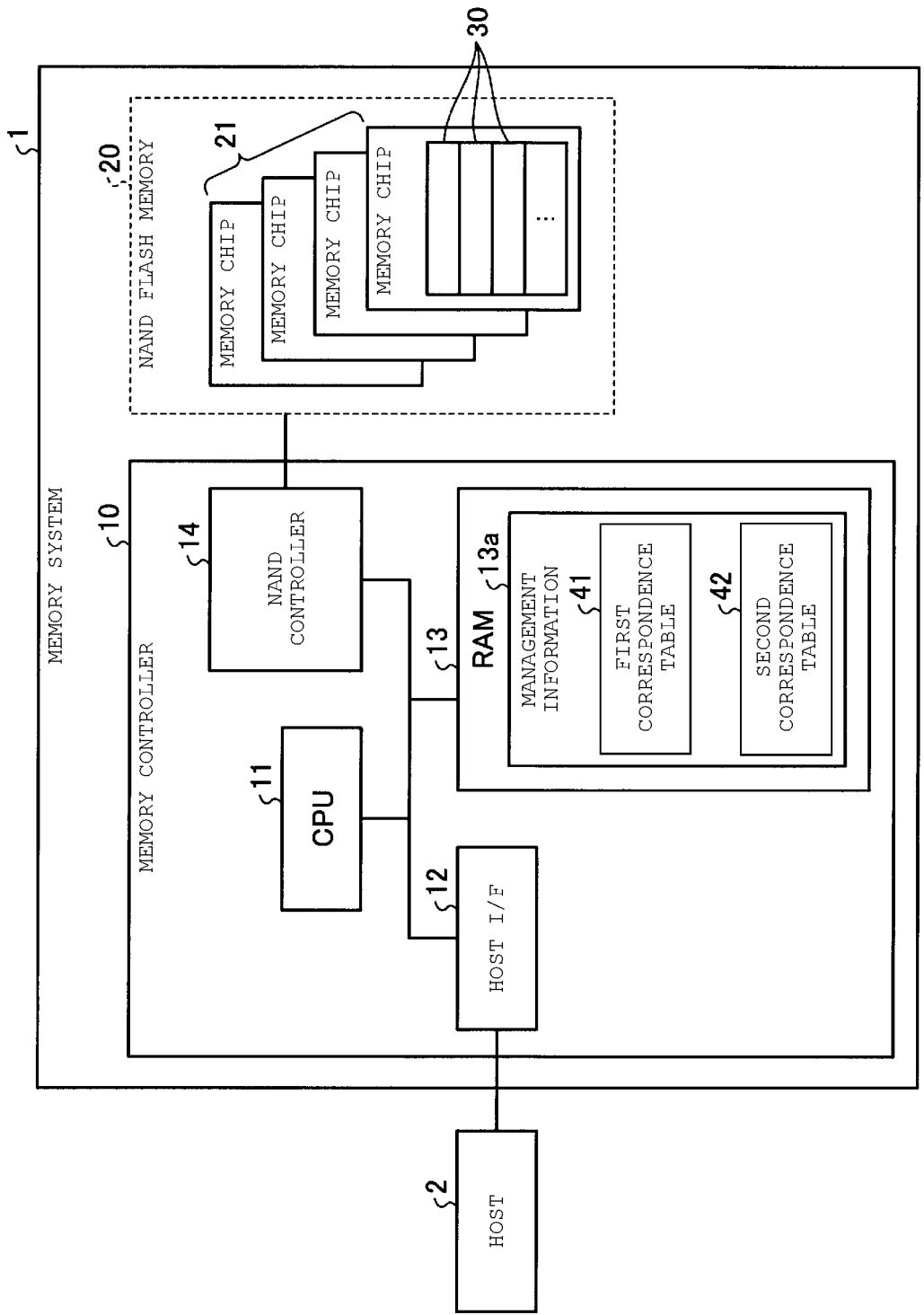
FIG. 1 is a diagram showing a configuration example of a memory system according to an embodiment.

FIG. 1 is a diagram showing a configuration example of a memory system 1 according to the embodiment. As shown in FIG. 1, the memory system 1 is connected to a host 2 through a communication interface based on a predetermined standard. The host 2 is, for example, a personal computer, a mobile information terminal, or a server. The memory system 1 can accept an access command from the host 2. The access command is a read command, a write command, a flush command, and the like. The flush command forcibly completes writing of delayed data in a NAND flash memory 20. Each read/write access command includes a logical address indicating an access destination. The logical address indicates a location in a logical address space in which the memory system 1 provides to the host 2. The memory system 1 accepts, for example, data to be written together with the write command. The memory system 1 is powered by the host 2 or another apparatus and is operated by the power.

The memory system 1 includes a memory controller 10 and a NAND flash memory (hereinafter, simply referred to as NAND memory) 20. The memory controller 10 is a circuit to execute a data transfer between the host 2 and the NAND memory 20. The memory system 1 may include a non-volatile memory, for example, a NOR flash memory, instead of the NAND memory 20.

The NAND memory 20 as a non-volatile semiconductor memory includes one or more memory chips 21. In the example of FIG. 1, the NAND memory 20 includes four memory chips 21. Each memory chip 21 includes a plurality of physical blocks 30. The physical block 30 is, for example, the minimum unit of storage area where erasure of data may be executed. The physical block 30 includes a plurality of pages. The page is, for example, the minimum unit of storage area where reading of data or programming of data may be executed in the NAND memory 20. In each physical block 30, a physical address is assigned to a unit smaller than one page. The unit is referred to as a cluster. A size of one cluster may be equal to or larger than the minimum unit of access from the host 2. In a case where the size of one cluster is larger than the minimum unit of access from the host 2, the size of one cluster may be two or more integer multiples of the minimum unit of access.

One logical management unit (referred to herein as a block group) includes a plurality of physical blocks 30. For example, one block group includes a plurality of physical blocks 30 belonging to different memory chips 21. Data stored in the plurality of physical blocks 30 making up the block group may be collectively erased.

The plurality of pages across each of the plurality of physical blocks 30 corresponding to one block group (one page per physical block) is referred to herein as a page group. One page group includes pages having the same number of pages as the number of physical blocks 30 belonging to one block group. The reading of the data or the programming of the data may be executed in parallel in the plurality of pages that make up the one page group.

The memory controller 10 as a controller circuit writes data to a certain physical block 30 of the NAND memory 20 according to an access command accepted from the host 2 to write the data to the NAND memory 20. When the data is written to the physical block 30, the memory controller 10 updates a first correspondence table 41 described below. When an improper shutdown occurs, the memory controller 10 sets a flag indicating that the improper shutdown has occurred. The improper shutdown means that the supply of the power to the memory system 1 is cut off without a predetermined end command issued from the host 2. The memory controller 10 causes the NAND memory 20 to perform a clean-up of the plurality (or all) of physical blocks 30 in a block group including a physical block 30 being written to at the time of the improper shutdown after the improper shutdown, e.g., when power is re-supplied to the memory system 1 after the improper shutdown. The clean-up is to move valid data in the physical block 30 to another physical block 30. The valid data is data which was present before the writing at the time of the improper shutdown and data in which the writing has previously ended at the time of the improper shutdown, among pieces of data in the physical block 30 in which data is being written to at the time of the improper shutdown. Data being written to a certain physical block 30 may be damaged at the time of the improper shutdown. In order to preserve other pieces of valid data in the physical block 30, the memory controller 10 moves other pieces of valid data to another physical block 30. The memory controller 10 updates a second correspondence table 42 described below as the clean-up is performed.

The memory controller 10 includes a central processing unit (CPU) 11, a host interface (host I/F) 12, a random access memory (RAM) 13, and a NAND controller 14 in order to carry out the above functions.

The CPU 11 controls the memory controller 10 based on a firmware program. The firmware program is, for example, stored in advance in the non-volatile semiconductor memory, such as the NAND memory 20, read from the NAND memory 20 at the time of activation, loaded into the RAM 13, and executed by the CPU 11.

When data from the host 2 is written to the NAND memory 20, the CPU 11 determines a physical location of a writing destination of the data from a free area. The physical location is represented by the physical address. The free area is an area where valid data is not stored and new data can be written. The CPU 11 maps the physical location of the determined writing destination to a logical address indicating a location of the data.

The RAM 13 provides a temporary storing area. A type of the memory configuring the RAM 13 is not limited to a specific type. The RAM 13 is configured with, for example, a dynamic random access Memory (DRAM), a static random access memory (SRAM), or a combination thereof. The RAM 13 stores management information 13a.

The management information 13a includes at least the first correspondence table 41 as first management information and the second correspondence table 42 as second management information. A logical cluster address as a first address is registered in the first correspondence table 41. The logical cluster address corresponds to the logical address indicating the location assigned to the data in the logical address space provided to the host 2, and is correlated with a block group number as a first logical number and a logical cluster number as a second logical number. Each of the block group number and the logical cluster number is a unit of logical management in the memory system 1. When data is written to any of the physical blocks 30 of the NAND memory 20, the first correspondence table 41 is updated. The block group number and the physical block number assigned to each of the plurality of physical blocks 30 of the NAND memory 20 are registered in correlation with each other in the second correspondence table 42. However, when a large amount of data movement occurs such as the clean-up after the improper shutdown, a second correspondence table is updated. The memory controller 10 can correlate the logical address transmitted together with the access command from the host 2 with a storage location of physical data in the NAND memory 20 with reference with the first correspondence table 41 and the second correspondence table 42.

The host interface 12 controls a communication interface between the memory controller 10 and the host 2. The host interface 12 executes the data transfer between the host 2 and the RAM 13 under control of the CPU 11.

The NAND controller 14 executes the data transfer between the NAND memory 20 and the RAM 13 under the control of the CPU 11. That is, the data transfer between the host 2 and the NAND memory 20 is executed through the RAM 13 under the control of the CPU 11.

First and Second Correspondence Table

Next, the first correspondence table 41 and the second correspondence table 42 of the NAND memory 20 will be further described with reference to FIGS. 2 to 6. FIGS. 2 to 6 are diagrams describing a correlation between physical blocks 30a to 30h and block groups 311g and 321g of the memory system 1 according to the embodiment.

Figure 2:
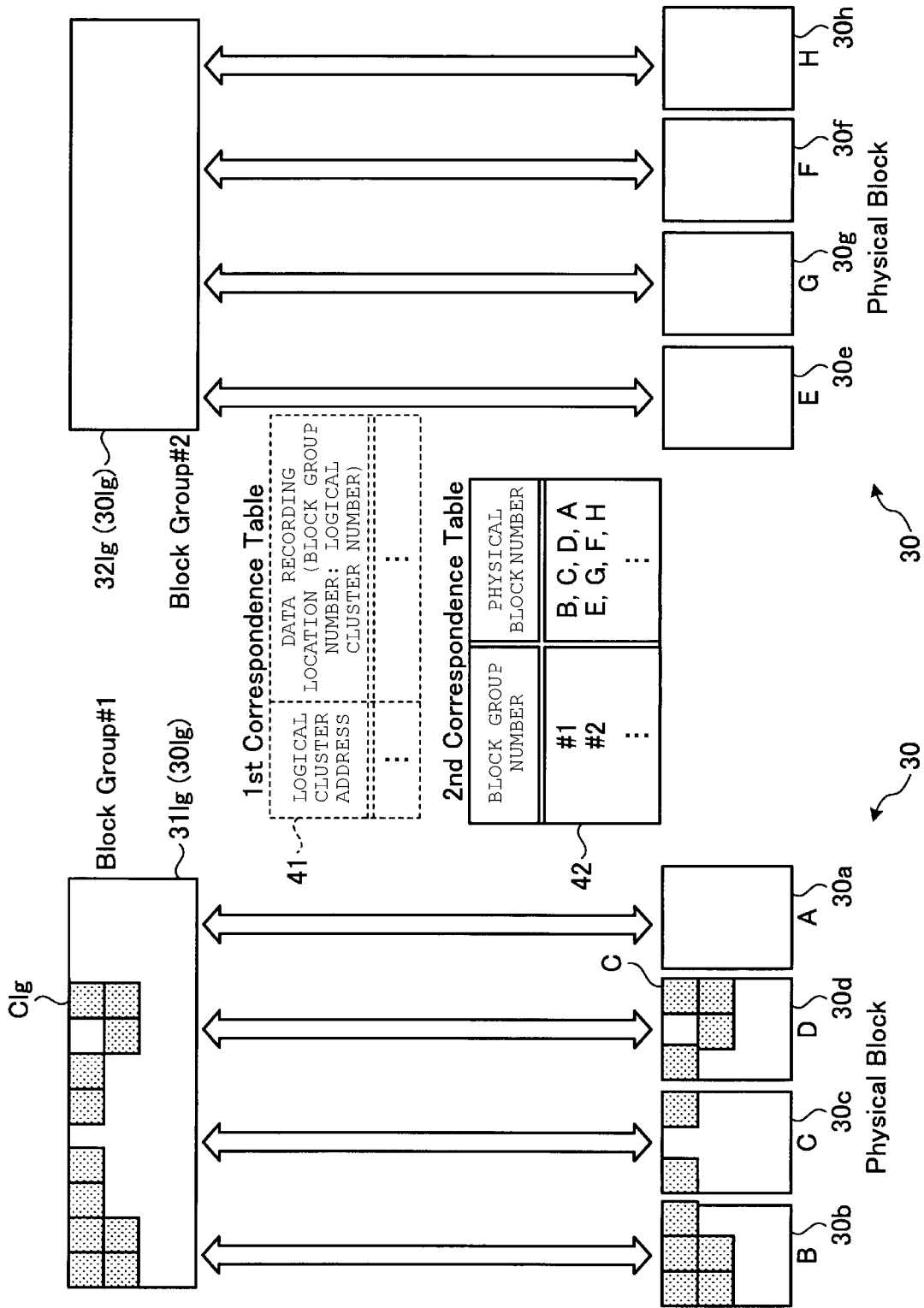
FIGS. 2-6 are diagrams describing a correlation between a physical block and a block group and changes thereto during operation of the memory system according to the embodiment.

As shown in FIG. 2, the second correspondence table 42 registers a correlation between the physical block number and the block group number. In the example of FIG. 2, the physical blocks 30a to 30d of physical block numbers A to D, are correlated with the block group 311g of block group number #1. The physical blocks 30e to 30h of physical block numbers E to H, are correlated with the block group 321g of a block group number #2.

Only clusters C storing valid data among the clusters C included in each physical block 30 are shown in FIG. 2. The logical cluster numbers are assigned to all the clusters C included in each physical block 30. The logical cluster numbers are obtained by assigning the numbers in order from the first cluster C of the first physical block 30 to the last cluster C of the last physical block 30 in one block group 301g. At the time, for example, a logical cluster number of a cluster C at a predetermined location in the physical block 30b correlated with the block group 311g may be the same as a logical cluster number of a cluster C at the same predetermined location in the physical block 30e correlated with the block group 321g. That is, the cluster C at the predetermined location in the physical block 30b and the cluster C at the same predetermined location in another physical block 30e have different physical block numbers but can have the logical cluster addresses having the same logical cluster number.

Figure 3:
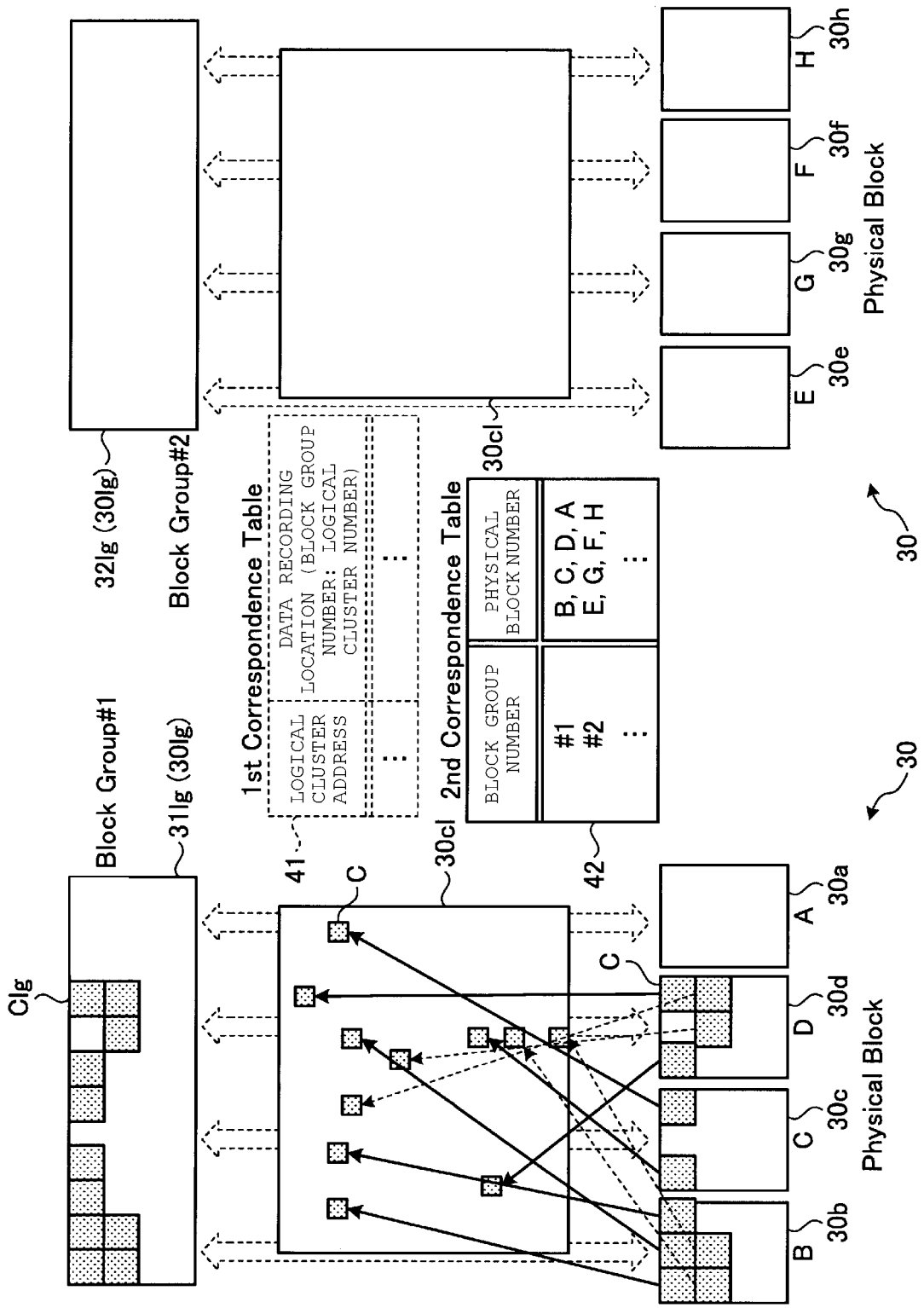

As shown in FIG. 3, a cluster number order arrangement 30c1 shows an example of a state where each cluster C of the plurality of physical blocks 30 (here, the physical blocks 30a to 30d) correlated with the one block group 301g (here, the block group 311g) is arranged in an order of the logical cluster number. In FIG. 3, a correlation between a location in each physical block 30 and a location in the cluster number order arrangement 30c1 is indicated by arrows only for the clusters C storing the valid data among a plurality of the clusters C. As shown in FIG. 3, the clusters C storing the valid data may not be contiguous but dispersed in the cluster number order arrangement 30c1 and each physical block 30. All the logical cluster numbers are not necessarily stored in the cluster number order arrangement 30c1. A logical cluster address not storing the logical cluster number is unused, or data indicating that an invalidation request is issued from the host 2 and data is deleted is stored in the logical cluster address.

Figure 4:
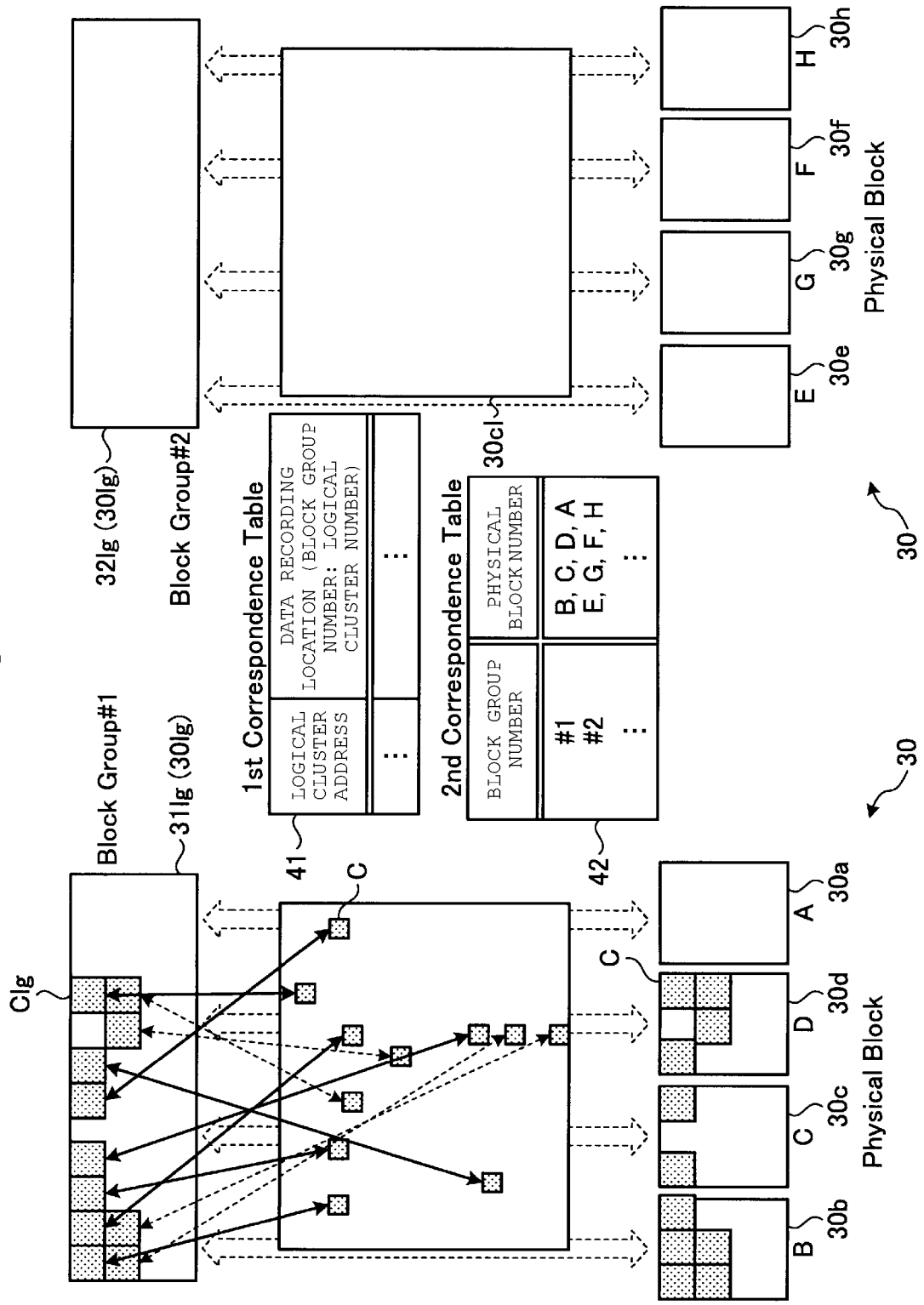

FIG. 4 shows a correlation between the locations of the clusters C arranged according to the cluster number order arrangement 30c1 and locations of clusters Clg in the block group 301g. In FIG. 4, the correlation between the locations in the block group 301g and the locations in the cluster number order arrangement 30c1 is indicated by arrows only for the clusters C storing the valid data among the plurality of the clusters C.

The first correspondence table 41 shows a correlation between a logical cluster address corresponding to a logical address designated from the host 2 and a block group number of a block group 301g and a logical cluster number in the block group 301g corresponding to the logical cluster address. That is, a predetermined logical cluster address is specified by the block group number and the logical cluster number corresponding to the predetermined logical cluster address.

Figure 5:
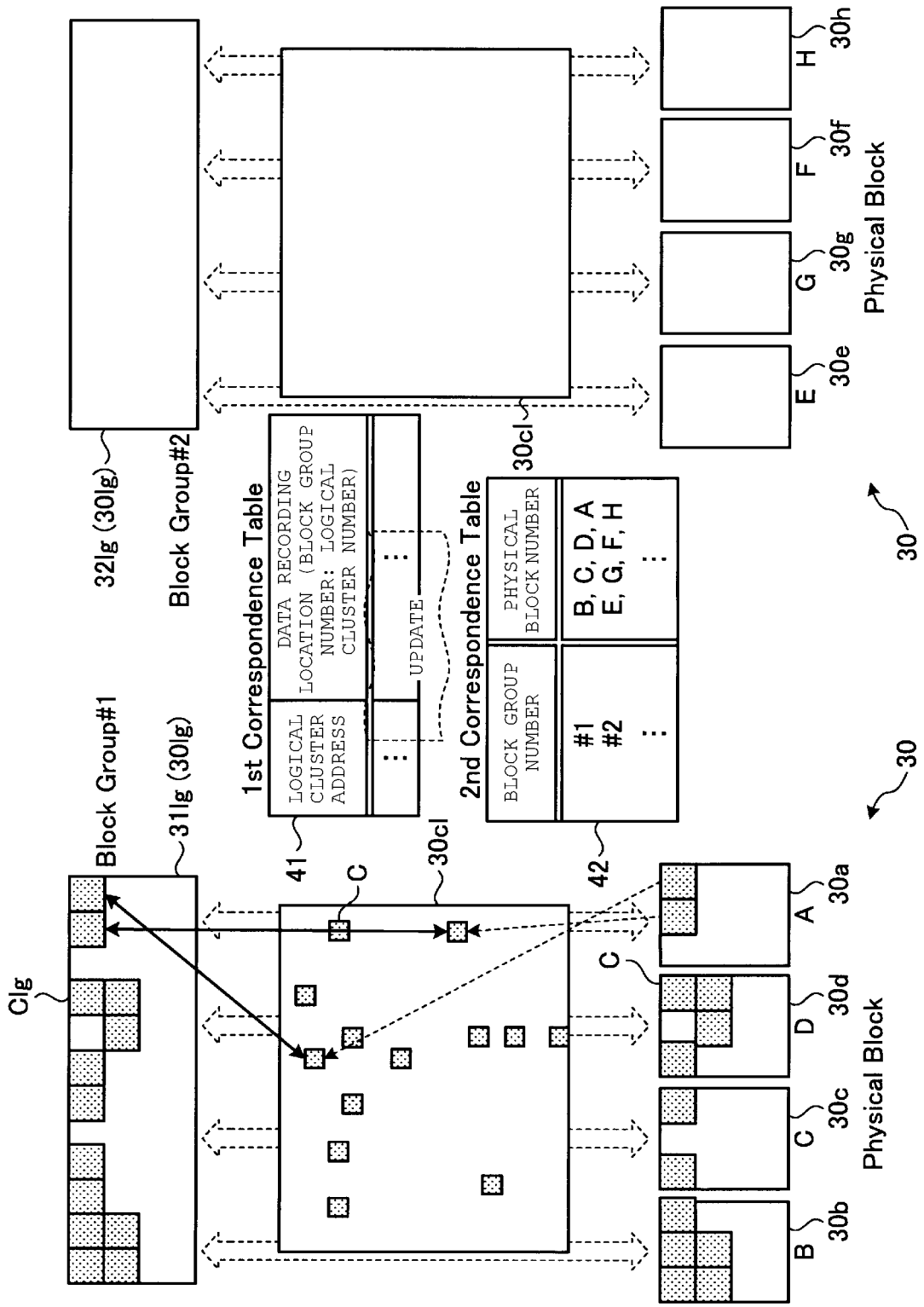

Here, as shown in FIG. 5, pieces of data for two clusters C are assumed to be newly stored in the physical block 30a. According to the storing, the memory controller 10 updates the first correspondence table 41. That is, in the first correspondence table 41, block group numbers and logical cluster numbers of the two clusters C to which the pieces of data are newly added is correlated with logical cluster addresses corresponding to the new pieces of data.

Figure 6:
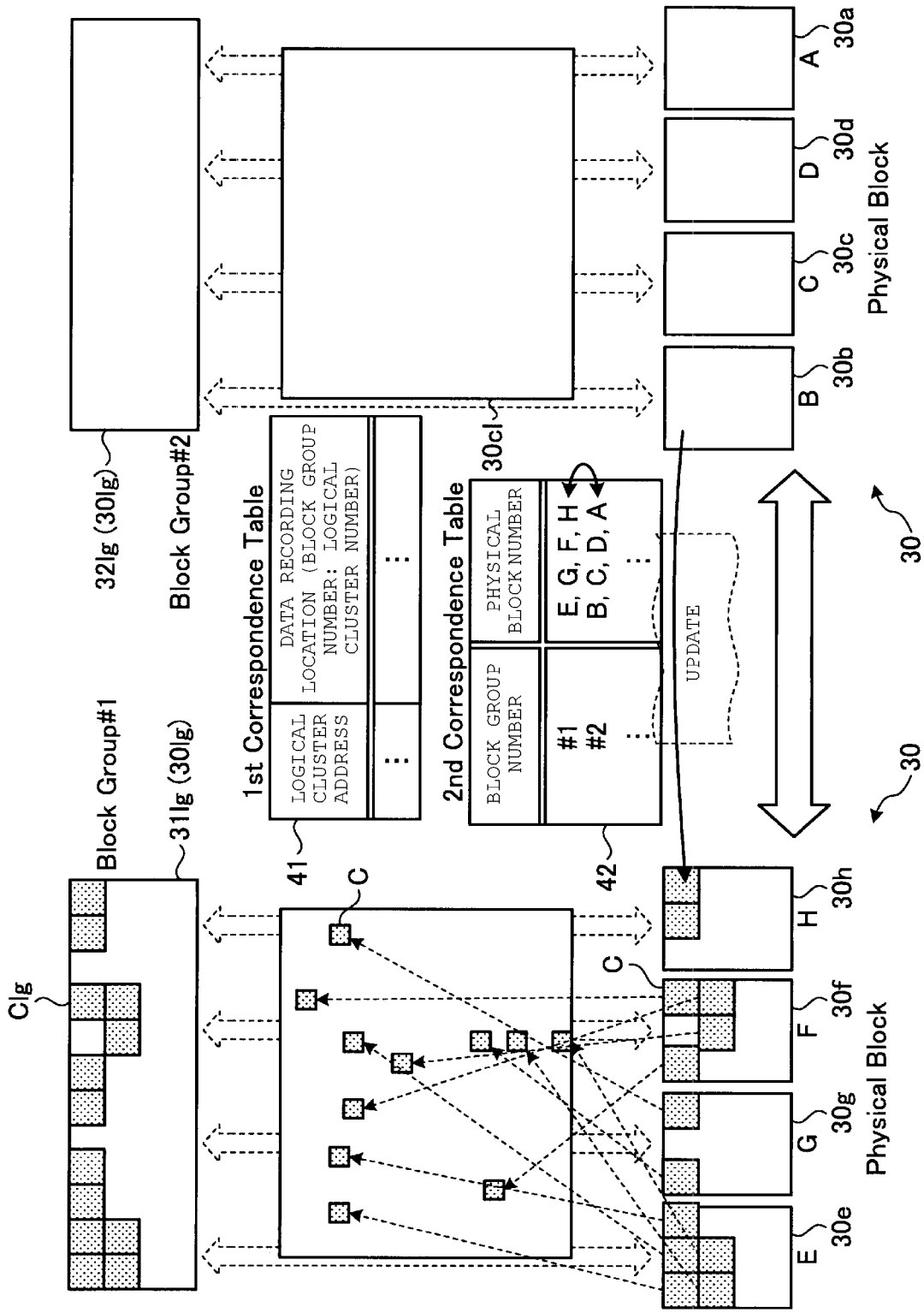

It is noted that an enormous amount of data rewriting occurs in the clean-up after the improper shutdown. Accordingly, a correlation between a logical address corresponding to rewritten data and a physical location where the data is stored in the NAND memory 20 changes. Therefore, the memory controller 10 updates the second correspondence table 42 instead of the first correspondence table 41 at the time of the clean-up. FIG. 6 shows the details of this operation.

In FIG. 6, it is assumed that pieces of data are being written to a partial area of the physical blocks 30a to 30d corresponding to the block group 311g at the time of the improper shutdown. The memory controller 10 moves all the pieces of valid data (data in which writing has completed and valid data previously stored) in another area of the block group 311g (the physical blocks 30a to 30d) to, for example, the physical blocks 30e to 30h corresponding to the block group 321g by a clean-up processing after the improper shutdown. At the time, the NAND memory 20 moves all the pieces of valid data to the physical blocks 30e to 30h while maintaining physical locations (physical cluster locations) of the pieces of data in each of physical blocks 30a to 30d. Accordingly, each piece of data is moved to a physical location where the block group number is different but the logical cluster number is the same.

Accordingly, the memory controller 10 updates the second correspondence table 42 so as to change the correlation between the block group number and the physical block number. That is, a correspondence destination of the physical blocks 30e to 30h which are movement destinations of the pieces of data is changed from the block group 321g to the block group 311g. The physical blocks 30a to 30d which are movement sources of the pieces of data are changed from the block group 311g to another block group 301g (here, the block group 321g). After the change in the correlation, a block group number and a logical cluster number of a cluster C in which each piece of data after the movement is stored are the same as the block group number and the logical cluster number of the cluster C in which each piece of data before the movement is stored. That is, a logical cluster address of the cluster C in which each piece of data after the movement is stored is the same as the logical cluster address of the cluster C in which each piece of data before the movement is stored.

In this manner, the logical cluster address of the moved data can be correlated with a physical storage location of the data after the movement by updating the second correspondence table 42 instead of the first correspondence table 41. In other words, the physical storage location of the data after the movement can be specified by the logical cluster address of the moved data only by updating the second correspondence table 42.

Operation Example of Memory System

Figure 7:
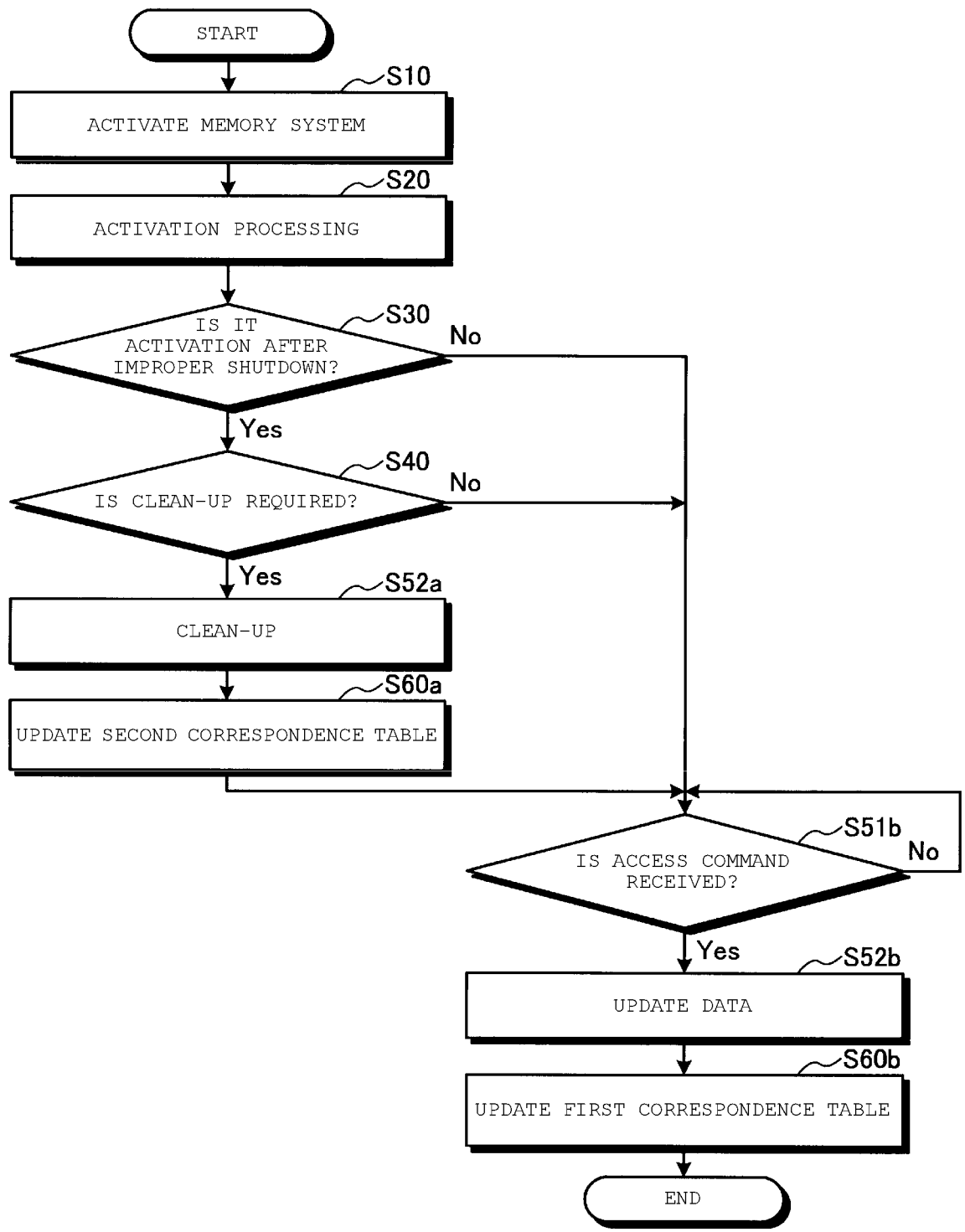
FIG. 7 is a flowchart showing an example of a procedure of a control operation of the memory system according to the embodiment.

Next, an example of a control operation in the memory system 1 will be described with reference to FIG. 7. FIG. 7 is a flowchart showing an example of a procedure of the control operation of the memory system 1 according to the embodiment.

In the control operation in the memory system 1, when the writing or the flush command is issued from the host 2 and data in a physical block of the NAND memory 20 is updated, a correspondence between a logical cluster address assigned to the data and a data storage location (block group number and logical cluster number) where the data is newly stored is updated. According to a data movement request of the memory controller 10, when the predetermined number or more of pieces of data in a certain physical block of the NAND memory 20 is moved to another physical block, the correspondence destination of the block group number corresponding to the physical block number of the movement source of the data is updated to the physical block number of the movement destination of the data.

That is, as shown in FIG. 7, when the memory system 1 is activated in S10, the memory system 1 performs activation processing in S20. In the activation processing, reading of a firmware program from the NAND memory 20, loading of management information stored in the NAND memory 20 into the RAM 13, and the like are performed.

In S30, the memory controller 10 of the memory system 1 confirms whether the activation is activation after the improper shutdown. That is, the memory controller 10 confirms presence or absence of the flag indicating that the improper shutdown occurs. In a case where the activation is not the activation after the improper shutdown (No), the processing proceeds to S51b.

In a case where the activation is the activation after the improper shutdown (Yes in S30), the memory controller 10 determines whether the clean-up is required in S40. When the clean-up is not required (No), the processing proceeds to S51b.

In a case where a physical block 30 being written at the time of the improper shutdown is present and the clean-up is required (Yes in S40), the memory controller 10 performs the clean-up processing in S52a. After the data movement is performed by the clean-up processing, that is, after a large amount of data is moved, the memory controller 10 updates the second correspondence table 42 in S60*a*. That is, when the large amount of data movement is required, the second correspondence table 42 is updated. The criteria of the amount of data movement may be predetermined.

Subsequently, the memory controller 10 waits for the reception of the access command from the host 2 in S51*b* (No). When the access command is received (Yes), the memory controller 10 causes the NAND memory 20 to update the data in S52*b* and updates the first correspondence table 41 in S60*b*.

Thus, the control operation of the memory system 1 ends.

COMPARISON EXAMPLE

Here, an operation of a memory system of a comparison example will be described with reference to FIG. 8. In the memory system of the comparison example, the correspondence is made between the logical cluster address and the physical storage location of the data after the movement by updating a first correspondence table 41' instead of a second correspondence table 42' at the time of the clean-up after the improper shutdown.

Figure 8:
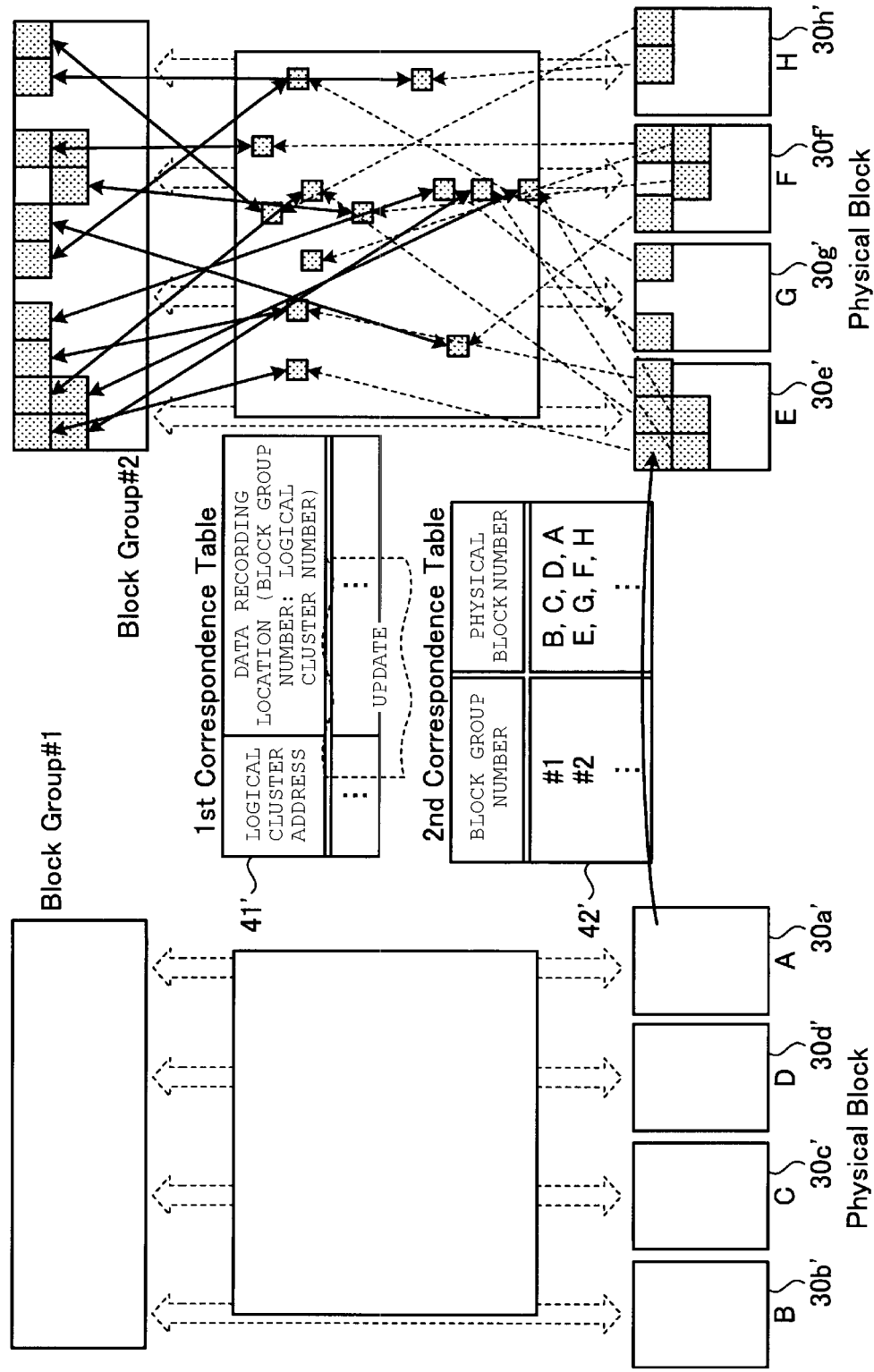
FIG. 8 is a diagram describing a correlation between a physical block and a block group in a memory system according to a comparison example.

That is, as shown in FIG. 8, it is assumed that pieces of data which are being written at the time of the improper shutdown are moved from physical blocks 30*a*' to 30*d*' to physical blocks 30*e*' to 30*h*'. A memory controller of the comparison example updates the first correspondence table 41' in the same manner at the time of normal writing in accordance with the movement of the data. However, with this, an enormous amount of the update of the first correspondence table 41' is required in accordance with an enormous amount of data movement and an activation processing time is prolonged.

In the memory system 1 of the embodiment, the second correspondence table 42 is updated instead of the first correspondence table 41. Accordingly, the physical location of the moved data can be specified by the update that only changes the correspondence between the physical block 30 in which the moved data is stored and the block group 301*g*. At the time, the correspondence between the logical cluster address and the data storage location is not changed before and after the movement. Therefore, since very simple update work is sufficient even though an enormous amount of data is moved, it is possible to reduce the activation processing time.

Modification 1

The configuration of the embodiment can also be employed at the time of refresh processing.

In the NAND flash memory, the refresh processing to rewrite stored data to a different physical location is performed in order to prevent a loss of the stored data due to a spontaneous discharge or a change in a value of the stored data due to repetition of read processing to adjacent cells.

At the time of the refresh processing, since the data is moved from a physical block to be refreshed to another physical block, an enormous amount of data movement occurs.

Therefore, a memory controller 10*a* of a modification 1 of the embodiment updates the second correspondence table 42 instead of the first correspondence table 41 also at the time of the refresh processing.

That is, in the second correspondence table 42 of the modification of the embodiment, the physical block number of each of a plurality of physical blocks in the NAND flash memory 20 is correlated with the block group number similarly to the embodiment described above. At the time of the refresh for holding the data, when the data to be refreshed is moved from the physical block in which the data is stored to the other physical block, the correspondence destination of the block group number corresponding to the physical block number of the movement source of the data is updated to the physical block number of the movement destination of the data. An example of a procedure of a control operation of a memory system according to the modification 1 of the embodiment will be described with reference to a flowchart of FIG. 9.

Figure 9:
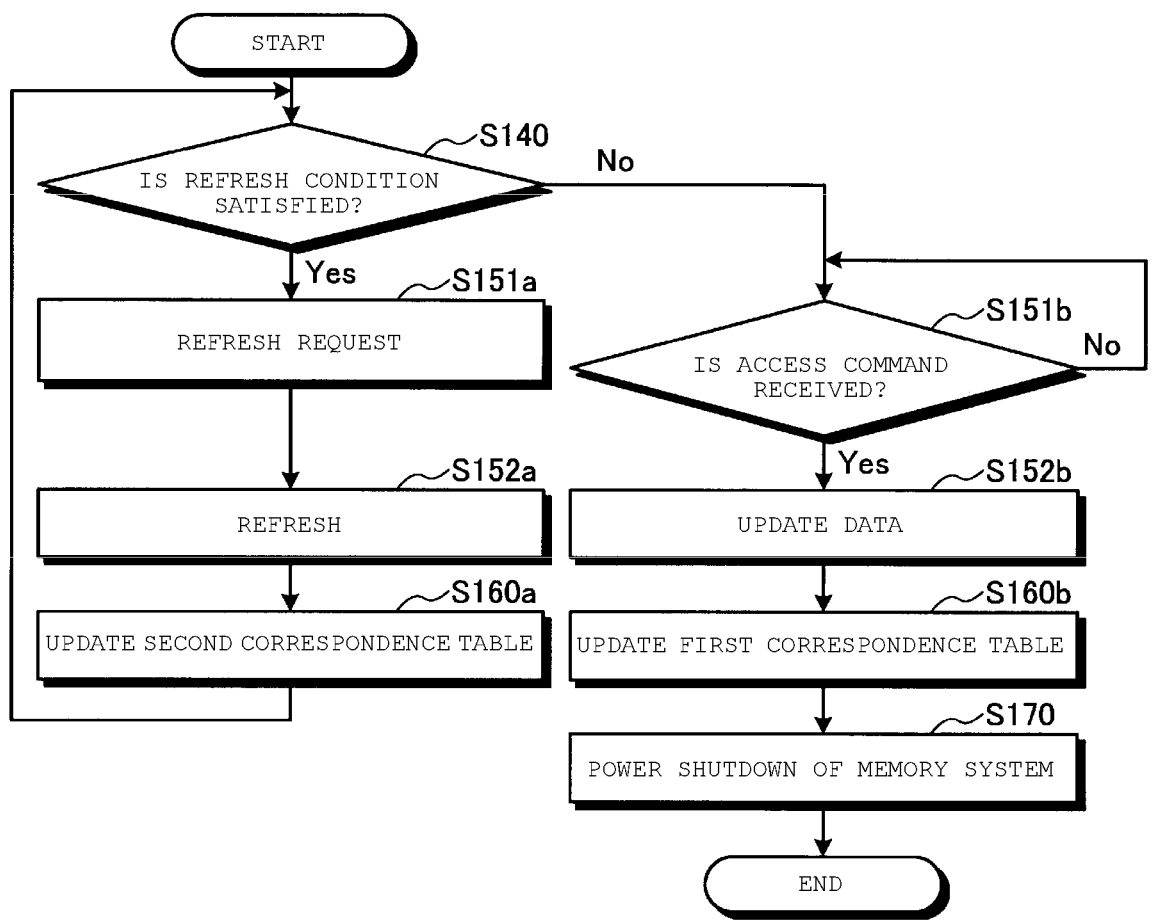
FIG. 9 is a flowchart showing an example of a procedure of a control operation of a memory system according to a modification of the embodiment.

As shown in FIG. 9, the memory controller 10*a* of the modification 1 of the embodiment determines whether the condition for refresh processing, including whether an elapsed time from a previous program or erasure reaches a threshold value or the number of readings to an adjacent cell reaches a threshold value, is satisfied in S140. In a case where the execution condition is not satisfied (No), the memory controller 10*a* waits for the reception of the access command from the host 2 (No) in S151*b*. When the access command is received (Yes), the memory controller 10*a* causes the NAND memory 20 to update the data in S152*b* and updates the first correspondence table 41 in S160*b*.

When the condition for refresh processing is satisfied (Yes in S140), the memory controller 10*a* performs the refresh with respect to a predetermined physical block in S151*a*. After the data movement is performed according to the refresh request, that is, after a large amount of data movement is performed, the memory controller 10*a* updates the second correspondence table 42 in S160*a*.

The memory controller 10*a* repeats the above operations until the power of the memory system is shut down in S170.

Thus, the control operation of the memory system ends.

In this manner, in the memory system of the modification 1 of the embodiment, the update of the second correspondence table instead of the first correspondence table is performed at the time of a large amount of data movement in accordance with the refresh. Accordingly, it is possible to quickly complete the refresh.

Modification 2

The configuration of the embodiment can also be employed at the time of wear-leveling for making uniform the number of writings across the physical blocks.

Wear-leveling processing is a technique that levels low writing frequency of data and moves data in a block group holding a physical block with the small number of erasures to a block group holding a physical block with a large number of erasures in order to make uniform the number of writings across the physical blocks. When the data in the block group holding the physical block with a small number of erasures is moved to the block group holding the physical block with a large number of erasures, a large amount of data movement may occur.

In this manner, in a memory system of a modification 2 of the embodiment, the second correspondence table is updated instead of the first correspondence table at the time of a large amount of data movement in accordance with the wear-leveling processing. Accordingly, it is possible to quickly complete the wear-leveling processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a first memory including a plurality of physical blocks;
   a second memory that stores
      a first correspondence table in which a plurality of logical cluster addresses which are a plurality of addresses respectively assigned to data received from a host are correlated with: (i) a plurality of block group numbers respectively corresponding to a plurality of block groups, and (ii) a plurality of logical cluster numbers respectively corresponding to a plurality of locations within the block group, and
      a second correspondence table in which first physical block numbers corresponding to first physical blocks among the plurality of physical blocks are correlated with a first one of the plurality of block group numbers, and second physical block numbers corresponding to second physical blocks among the plurality of physical blocks are correlated with a second one of the plurality of block group numbers; and
   a controller circuit, wherein the controller circuit is configured to:
      update the first correspondence table, when new data is written to one of the first physical blocks upon receiving a write command from the host, to correlate a first logical cluster address assigned to the new data with the first one of the plurality of block group numbers and a first one of the plurality of logical cluster numbers; and
      update the second correspondence table so that the second physical block numbers corresponding to the second physical blocks among the plurality of physical blocks are correlated with the first one of the plurality of block group numbers, when moving data which was written to the first physical blocks to the second physical blocks.

2. The memory system according to claim 1, wherein the controller circuit updates the second correspondence table when restarting the memory system after an improper shutdown occurred, the improper shutdown is a shutdown that does not pass through a predetermined power shutdown procedure.

3. The memory system according to claim 1, wherein the controller circuit updates the second correspondence table without changing the first correspondence table.

4. The memory system according to claim 1, wherein the controller circuit updates the second correspondence table without changing the block group number and the logical cluster number in the first correspondence table.

5. The memory system according to claim 1, wherein the data are being moved for a clean-up processing.

6. The memory system according to claim 1, wherein the data are being moved for a refresh processing.

7. The memory system according to claim 1, wherein the data are being moved for a wear-leveling processing.

8. The memory system according to claim 1, wherein the controller circuit updates the second correspondence table without changing the first correspondence table when the new data written to the one of the first physical blocks upon receiving the write command from the host is greater than or equal to a threshold amount of data, and wherein the controller circuit updates the first correspondence table without changing the second correspondence table when the new data written to the one of the first physical blocks upon receiving the write command from the host is less than a threshold amount of data.

9. A memory system comprising:
   a first memory including a plurality of physical blocks;
   a second memory that stores
      a first correspondence table in which a plurality of logical cluster addresses which are a plurality of addresses assigned to data received from a host and specifying a data storage location are correlated with: (i) a plurality of block group numbers respectively corresponding to a plurality of block groups, and (ii) a plurality of logical cluster numbers respectively corresponding to a plurality of locations within the block group, and
      a second correspondence table in which first physical block numbers corresponding to first physical blocks among the plurality of physical blocks are correlated with a first one of the plurality of block group numbers, and second physical block numbers corresponding to second physical blocks among the plurality of physical blocks are correlated with a second one of the plurality of block group numbers; and
   a controller circuit, wherein the controller circuit is configured to update the second correspondence table so that the second physical block numbers corresponding to the second physical blocks among the plurality of physical blocks are correlated with the first one of the plurality of block group numbers, when data stored in the first physical blocks are rewritten into the second physical blocks.

10. The memory system according to claim 9, wherein the data are being rewritten in conjunction with a refresh processing.

11. The memory system according to claim 9, wherein the data are being rewritten in conjunction with a wear-leveling processing.

12. The memory system according to claim 9, wherein the controller circuit updates the second correspondence table without changing the first correspondence table when the data stored in the first physical blocks that is rewritten into the second physical blocks is greater than or equal to a threshold amount of data, and wherein the controller circuit updates the first correspondence table without changing the second correspondence table when the data stored in the first physical blocks that is rewritten into the second physical blocks is less than a threshold amount of data.

* * * * *